June 2, 1959 — G. M. GIBSON — 2,888,706
CASTER BRACKET
Filed Feb. 23, 1956
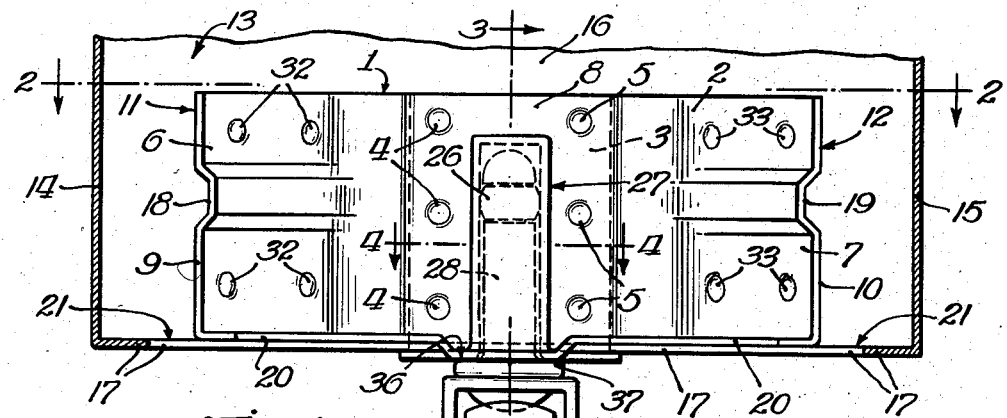
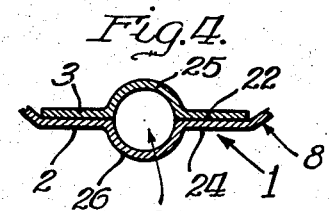
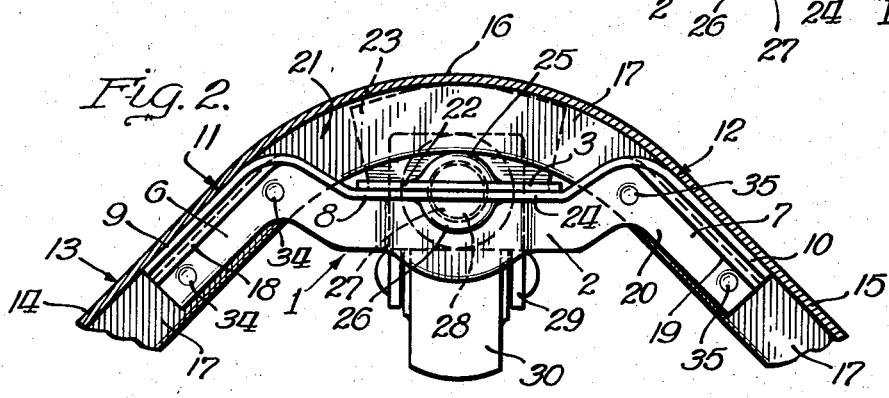
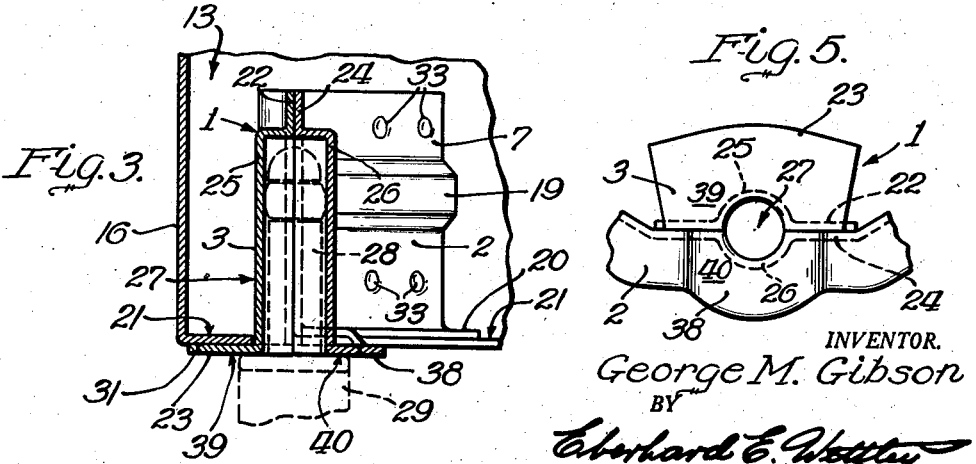
INVENTOR.
George M. Gibson
BY Eberhard E. Wolley
Atty.

United States Patent Office 2,888,706
Patented June 2, 1959

2,888,706

CASTER BRACKET

George M. Gibson, Bellevue, Iowa

Application February 23, 1956, Serial No. 567,187

12 Claims. (Cl. 16—29)

This invention is directed in general to a new and novel bracket having a caster receiving socket construction, the bracket being designed for extreme stability and for easy attachment.

In its more specific aspects, the invention is concerned with a new bracket arrangement incorporating a socket structure to receive the shank of a caster, this bracket arrangement being devised for attachment with a flanged portion of an apron or skirt comprising a part of a housing wall of a domestic appliance such as a washing machine, clothes dryer, ironer or of any caster supported devices such as utility cabinets or tables, etc.

One of the objects of the invention is to provide a caster bracket that is constructed from stampings suitably secured together, as by spot welding, to thus produce a simple, inexpensive and light weight item capable of providing a sturdy caster receiving member.

Another object of the invention is to provide a bracket for a caster wherein the bracket is formed to include coacting fastening members that lend themselves to convenient attachment with a wall portion of a device adapted for caster support.

As another object the invention is concerned with a bracket arrangement so constructed as to provide a rigidly secured and stabilized unit that will not give, warp or weave under the normal use of a caster supported cabinet or appliance.

A still further object of the invention is to provide a bracket construction that is specifically designed for mounting or attaching to a light gauge sheet metal wall of a machine or appliance having an apron or cabinet wall of such character normally providing an exterior cover or housing.

In the past, many caster receiving mechanisms have been used for connection with a machine or device, but such mechanisms were generally attached to supplemental framework or legs of the supported means. The mechanisms were heavy and, as a rule, cast to give strength and to supply fastening parts or wings for bolts and nuts. Any head of a bolt or part of a fastening means that came through a wall or skirt of a neatly designed exterior of a cabinet or machine proved a detraction from the appearance of the device so made and such fastening means were, therefore, quite objectionable for the reasons discussed.

It is thus another object of the invention to devise a bracket that is capable of attachment to a sheet metal wall without the use of any fastening accessories, as by soldering, welding or spot welding, in such a manner so as to not change the exterior appearance contour, or configuration of the adjacent wall receiving the bracket.

Another object is to provide a light weight bracket of assembled stamped members for the reception of a caster and which is ideal for attachment to a corner section of an appliance skirt, wall or cabinet corner of a device or machine, and which not only can be rigidly assembled with the walls at such a corner, but which will also inherently contribute to strengthen the structural parts of the associated corner section as an added bulwark toward greater stability in the caster carrying area of such a device or machine.

A still further object of this invention is to make a bracket for a caster socket that will coact with a flanged end of an apron, skirt or wall of an appliance or machine in such a fashion as to utilize the flange and the adjacent wall portion as the securing parts of the appliance or machine to receive the caster bracket.

Other objects and advantages relating to the caster bracket of the present invention shall hereinafter appear in the following detailed description having reference to the accompanying drawing forming a part of this specification.

In the drawing:

Fig. 1 is a side elevational view of a fragmentary wall portion of an appliance or machine as seen from the interior and at one corner of the housing or cabinet, illustrating a preferred embodiment of the caster bracket of the present invention as installed and adapted to receive a caster for the movable support of such appliance or machine;

Fig. 2 is a plan sectional view of the caster bracket as attached and used and as seen substantially along the plane of the line 2—2 in Fig. 1;

Fig. 3 is a vertical cross sectional view of the caster bracket and associated structure as the same appears when seen substantially along the plane of the line 3—3 in Fig. 1;

Fig. 4 is a detailed cross sectional view of a portion of the caster bracket as seen along the plane of the line 4—4 in Fig. 1; and Fig. 5 is a fragmentary bottom plan view of the central part of the caster bracket to further illustrate certain details of construction thereof.

In the drawings, the caster bracket 1 is composed of an assembly of a pair of stampings 2 and 3 that are, in this case, spot welded together at the multiple points 4 and 5 along coextensive portions of the two sheet metal members. Stamping 2 is the larger of the two members and comprises a pair of lateral wings 6 and 7 connected by an intermediate bridge 8, with the wings having vertical walls 9 and 10 providing exterior vertical surfaces 11 and 12 that are angularly disposed with respect to each other.

As best shown in Figs. 1 and 2, a housing 13 of a cabinet, appliance or machine is here illustrated in the form of a light weight sheet metal skirt, apron or panel having contiguous walls 14 and 15 joined by a rounded wall corner 16, these wall portions all terminating with a common inturned coplanar flange 17. Walls 14 and 15 are arranged at 90 degrees to each other and the caster bracket 1 is made with the exterior surfaces 11 and 12 of the lateral wings 6 and 7 disposed at 90 degrees to each other for coincident surface contact with the inner surfaces of the housing or cabinet walls 14 and 15 that are also disposed at 90 degrees to each other.

Each wing 6 and 7 includes an intermediate bead or channel 18 and 19 for strength and stability. A continuous flange or ledge 20 is provided at the bottom of the stamping 2 to establish a continuous foot on this member 2 of the bracket 1 to seat or set upon the upper face 21 of the housing or cabinet flange 17. Flange or ledge 20 thus also provides a stabilizing or strengthening element which coacts with the wings 6 and 7 and with the beads or channel sections 18 and 19 of the wings to stiffen the bracket horizontally in the length of the bracket or transversely thereof, with the flange or ledge 20 forming a continuous reference element or foot as described to abuttingly engage and to seat upon the upper face 21 of flange 17 of the walls of the supported appliance or machine.

Stamping 2 is assembled by spot welding at the multiple points 4 and 5 with the smaller stamping 3. The stamping 3 comprises an L-shaped piece having a vertical leg 22 and a horizontal wing or leg 23. Bridge 8 of stamping 2 includes a central vertical straight wall 24 that receives leg 22 of stamping 3 in face to face relation, and both the leg 22 and wall 24 are supplied with coacting semicircular dead ended sleeves 25 and 26 that together provide and form a closed end socket 27 adapted to receive the shank 28 of the forked frame 29 of a caster wheel 30.

The wing or horizontal leg 23 of stamping 3 is vertically spaced downwardly in relation to the flange or ledge 20 on stamping 2 to form or establish a vertical space or channel clearance between the upper face of 23 and lower face on 20 to receive the housing or cabinet flange 17 therebetween. While the ledge 20 rests upon the face 21 of flange 17, the upper side of the wing 23 of stamping 3 abuts the undersurface 31 of the flange 17 as seen in Fig. 3. This provides an anti-tilt feature to prevent inward bending or leaning of the caster shank socket 27 all aided and supplemented by the wings 6 and 7 of stamping 2 which are suitably attached to the walls 14 and 15 of the housing or cabinet wall 13 as by means of the multiple spot welds at 32—32 on wing 6 and 33—33 on wing 7. The entire bracket as a unit is attached to the cabinet walls as described and the flange or ledge 20 is secured at the wing sections 6 and 7 by means of the multiple spot welds 34—34 and 35—35 to the adjacent portions of the flange 17 of the contiguous cabinet walls.

Thus the caster bracket is an assembly of a pair of stampings that together form a vertical socket unit therebetween for the caster shank. Also, each stamping is L-shaped in vertical cross section to present winged or flanged portions to contact the cabinet wall and flange and on opposite sides of the flange to provide vertical and horizontal fastening surfaces. In this connection it should also be noted that wing 23, the horizontal leg of stamping 3, is also spot welded to the flange 17 as a further stabilized fastening for the bracket as a whole.

By the equal angular placement of wings 6 and 7 in relation to a line bisecting the cabinet corner and intersecting the axial center of the caster socket 27, any force on the caster tending to tilt the bracket will be further counteracted by the spot welds 32—32 and 33—33 which are subject to both shearing and tensional forces. And as before mentioned, leg 23 of stamping 3 is under flange 17 to obviously counteract inward tilt of the bracket 1.

Outward tilt of bracket 1 is well counteracted by the wings 6 and 7 plus the reaction of the ledge 20 upon the flange 17, and any tilt in the direction of the length of the caster bracket 1 is compressively stemmed through the angular cross sectional structure of the stamping 2, with further twist being counteracted by the abutting contact and attachment of leg 23 of the stamping 3 with the underside of flange 17 of the cabinet.

It is another feature of the bracket to provide a level bearing surface to receive the upper face 36 of the shank bearing 37 of the caster. The continuous flange or ledge 20 on stamping 2 is downwardly offset centrally thereof as at 38, as best shown in Figs. 3 and 5, so as to dispose this portion of the ledge in coplanar relation with the leg 23 of the stamping 3. This then establishes two coincident adjacent surfaces 39 and 40 adapted as bearing surfaces to take the reaction of the caster shank bearing 37 and to thereby distribute the load on both halves or coacting joined parts 2 and 3 of the caster bracket arrangement 1.

The foregoing description has been directed to a preferred form of the invention as disclosed in the drawing. Certain changes are contemplated in the individual elements of the construction explained and in the combination of such elements without departing from the fundamental concept of the invention. Such modifications shall, however, be governed by the breadth and scope of the appended claim or claims as directed to the caster bracket arrangement of the present invention.

What I claim is:

1. A caster bracket, in combination with a housing, comprising a housing wall, and coacting bracket members secured together and providing a vertically arranged and independently suspended caster shank receiving socket therebetween, one of said members having wing sections adapted for connection with said housing wall at laterally spaced points to either side of said shank socket, and the other of said members having an extension thereon leading from said shank socket for connection with said housing wall at a location intermediate the spaced connections of the wings on said one member, said extension providing a lower terminal bearing area about one portion of said shank socket, and said wing sections including a flange element at an elevation coincident with said extension to provide a further lower bearing area about another portion of said shank socket, both of said bearing areas providing means to accommodate an adjacent bearing means of a caster.

2. A caster bracket, in combination with a housing having an upright wall provided with a horizontal flange, comprising coacting bracket members secured together and providing a caster shank receiving socket therebetween, one of said members having wing sections adapted for connection with said wall at laterally spaced points thereon and above said wall flange, said wing sections each including extended horizontal flanges adapted for spaced connections with one opposite outside face portion of said wall flange, and the other of said members having a leg formed thereon constructed and arranged to connect with another of the opposite outward face portions of said wall flange and at a location intermediate the spaced wing connections of said one member with said wall and wall flange.

3. In a caster bracket of the character set forth and defined in claim 2, and wherein said bracket members are spot welded together, and said wings of said one member are spot welded to the wall, while said wing flanges of said one member and said leg of the other of said members are all spot welded to the wall flange.

4. A caster mounting structure, in combination with a housing having an upstanding wall with a ledge extending laterally outwardly therefrom, said structure comprising coacting bracket members secured together and providing a caster shank receiving socket therebetween, one of said members having wing sections adapted for connection with said wall at spaced points thereon and above said wall ledge, said wing sections each having flanges provided for spaced connections with said wall ledge, and the other of said members having a leg formed thereon constructed and arranged to connect with said wall ledge at a location intermediate the spaced wing connections of said one member with said wall ledge, said wing flanges on said one member and the leg of the other of said members being arranged in vertically displaced locations to connect with said wall ledge on opposite sides thereof.

5. In a caster mounting structure, in combination with an upright panel having a horizontal ledge thereon, said structure comprising a pair of metal stampings, the first of said stampings having spaced wall elements arranged for securement at laterally spaced points against said panel, and a semicircular sleeve formed in said stamping, the second of said stampings having a wall section and a matching semicircular sleeve formed therein with said wall section comprising means for attachment with said first stamping whereby said sleeve portions together provide a complete socket for the reception of a caster shank, said second stamping having a flange member thereon angularly arranged with respect to said formed socket and adapted for connection with said panel ledge at a point located intermediate the securement points of the wall elements of said first stamping, said first stamping wall elements each having flange means thereon to stiffen the same and for securement to said panel ledge at spaced points thereon flanking said flange member fastening of said second stamping with said panel ledge.

6. In a caster receiving assembly, in combination with an upright panel having a horizontal flange, said assembly comprising a pair of metal stampings, the first of said stampings having spaced wall structures adapted for securement at laterally spaced points against said panel, and a semicircular sleeve formed in said stamping, the second of said stampings having a wall portion and a matching semicircular sleeve formed therein with said wall portion comprising means for attachment with said first stamping whereby said sleeve portions together form a complete socket for the reception of a caster shank, said second stamping having a ledge portion thereon angularly arranged with respect to said formed socket and provided for connection with said panel flange at a point located intermediate the securement points of the wall structures of said first stamping, said first stamping wall structures each having flange means thereon to stiffen the same and for securement to said panel flange at laterally spaced points thereon flanking said ledge portion fastening of said second stamping with said panel flange, said spaced flange means of said wall structures each occupying a position in one horizontal plane and said ledge of said second stamping occupying a position in another horizontal plane spaced vertically from said one plane to provide face to face vertical clearance between said wall structure flange means and said ledge to receive said panel flange directly therebetween.

7. In a caster bracket in combination with an upright panel having a horizontal flange thereon, comprising a pair of metal stampings, the first of said stampings having spaced wall structures adapted for securement at laterally spaced points against said panel, the second of said stampings having a wall portion for attachment with said first stamping, and socket means carried by said stampings for the reception of a caster shank structure, said second stamping having a ledge member thereon adapted for connection with said panel flange at a point located intermediate the securement points of the wall structures of said first stamping, said first stamping wall structures each having flange means thereon to stiffen the same and for securement to said panel flange at spaced points thereon flanking said ledge member fastening of said second stamping with said panel flange, said flange means of said wall structures comprising spaced flange members lying in a common horizontal plane, and said ledge member forming another flange member occupying a position in a second horizontal plane spaced vertically from said common plane to provide face to face separation between said respective members in said spaced planes to establish clearance for the reception of said panel flange therebetween, certain portions of said members being offset adjacent the socket means of said stamping assembly to provide a common coplanar abutment area about said socket means to form a bearing portion for the caster shank structure.

8. A caster bracket assembly in combination with a corner portion of an upright panel having a horizontally inturned ledge extending thereabout, said assembly comprising a first stamping having a pair of upright walls thereon secured to laterally separated portions of said panel and to either side of the corner, flanges on said walls to seat on top of said panel ledge, and a connecting upright wall spanning said corner and having a half socket vertically formed therein, a second stamping having a coacting half socket therein, said second stamping being adapted for securement with said spanning wall of the other stamping to provide a complete socket to receive the shank of a caster, said second stamping having a flange thereon extending laterally from said socket toward the corner of said panel for connection beneath said panel ledge to counteract inward tilting of said socket means away from said panel corner, said upright walls and the flanges of said first stamping being angularly positioned to either side of said corner to counteract tilting of said socket means in the general plane of the stamping and in directions toward or away from the corner portion of said panel.

9. A caster bracket for attachment with a horizontal flange extending outwardly from an upright wall, said caster bracket comprising a complementary pair of metal stampings having matched semicircular sleeve portions forming a socket to receive a caster stem therein, the first of said stampings having coplanar flange elements formed thereon and spaced laterally to either side of said socket and providing mounting means to seat upon the top of said wall flange, said coplanar flange elements of said stamping including upright wing sections to abut spaced surface portions of said wall at either side of said socket, and the second of said stampings having a flange member thereon projecting from said socket toward the wall and extending underneath said wall flange for direct contact therewith to counteract tilting of said wing sections of said first stamping in a direction away from the wall areas contacted thereby and to counteract separation of the flange elements thereof from contact with said wall flange.

10. In a caster bracket as in claim 9 wherein said flange member of said second stamping provides a horizontally arranged bearing surface adjacent the socket, and said first stamping includes a flanged continuation between said coplanar flanged elements to provide a further bearing surface adjacent said socket, both of said bearing surfaces together functioning to receive the reactionary means of a caster stem thereagainst.

11. A caster bracket, in combination with one corner of a housing, comprising a pair of angularly disposed upright housing walls connected by a contiguous corner wall, coacting bracket members connected together and providing a caster shank receiving socket therebetween, one of said members having a pair of lateral wings angularly arranged for surface contact and securement with said angularly disposed housing walls at spaced locations, and a bridge extending in unsupported relation between said wings to support said other member at the side facing said corner wall, said other member having a projecting leg element thereon constructed and arranged for independent securement with said corner wall at a location intermediate the laterally spaced locations of said wing connections with the angularly disposed housing walls, said leg element comprising means to prevent tilting of said unsupported bridge of said wing members in a vertical plane bisecting said corner wall, and said leg element and said lateral wings all comprising means to prevent tilting of both of said members in a direction substantially at right angles to the aforesaid vertical plane, and said housing wall portions being provided with a flange, and said wings of said one wall member having coplanar flanges thereon arranged at one elevation for cooperation with said leg element of the other of said members, and said leg element being disposed at another elevation to provide coacting attachment means with said wing flanges for connection with the flange of said housing wall portions at separated points along said latter flange and at opposite outward face portions thereof.

12. A caster bracket, in combination with one corner of a housing, comprising a pair of angularly disposed upright housing walls connected by a contiguous corner wall, coacting bracket members connected together and providing a caster shank receiving socket therebetween, one of said members having a pair of lateral wings angularly arranged for surface contact and securement with said angularly disposed housing walls at spaced locations, and a bridge extending in unsupported relation between said wings to support said other member at the side facing said corner wall, said other member having a projecting leg element thereon constructed and arranged for independent securement with said corner wall at a location intermediate the laterally spaced locations of said wing connections with the angularly disposed housing walls, said leg element comprising means to prevent tilting of said unsupported bridge of said wing members in a vertical plane bisecting said corner wall, and said leg element and said lateral wings all comprising means to prevent tilting of both of said members in a direction substantially at right angles to the aforesaid vertical plane, and said housing wall portions being provided with a flange, and said wings of said one wall member having coplanar flanges thereon arranged at one elevation for cooperation with said leg element of the other of said members, and said leg element being disposed at another elevation to provide coacting attachment means with said wing flanges for connection with the flange of said housing wall portions at separated points along said latter flange and at opposite outward face portions thereof, said wing flanges being disposed to seat upon the upper face of the housing wall flange and said leg element being disposed for contact with the underside of said same wall flange.

References Cited in the file of this patent

UNITED STATES PATENTS

| | | |
|---|---|---|
| 637,217 | Sherwin | Nov. 14, 1899 |
| 742,770 | Wheeler | Oct. 27, 1903 |
| 2,254,651 | Herold | Sept. 2, 1941 |
| 2,659,927 | Simpson | Nov. 24, 1953 |